US009265265B2

(12) United States Patent
Delius et al.

(10) Patent No.: US 9,265,265 B2
(45) Date of Patent: Feb. 23, 2016

(54) BIAXIALLY DRAWN TUBULAR FILM COMPRISING THREE ADJACENT POLYAMIDE-BASED LAYERS

(75) Inventors: Ulrich Delius, Frankfurt (DE); Bernhard Feron, Wiesbaden (DE)

(73) Assignee: Kalle GmbH, Wiesbaden (DE)

( * ) Notice: Subject to any disclaimer, the term of this patent is extended or adjusted under 35 U.S.C. 154(b) by 1252 days.

(21) Appl. No.: 12/065,090

(22) PCT Filed: Sep. 6, 2006

(86) PCT No.: PCT/EP2006/008666
§ 371 (c)(1),
(2), (4) Date: Feb. 28, 2008

(87) PCT Pub. No.: WO2007/028582
PCT Pub. Date: Mar. 15, 2007

(65) Prior Publication Data
US 2008/0248268 A1    Oct. 9, 2008

(30) Foreign Application Priority Data
Sep. 9, 2005   (DE) .......................... 10 2005 043 287

(51) Int. Cl.
| | |
|---|---|
| *A22C 13/00* | (2006.01) |
| *B32B 27/08* | (2006.01) |
| *B32B 27/20* | (2006.01) |
| *B32B 27/34* | (2006.01) |

(52) U.S. Cl.
CPC ............. *A22C 13/0013* (2013.01); *B32B 27/08* (2013.01); *B32B 27/20* (2013.01); *B32B 27/34* (2013.01); *A22C 2013/002* (2013.01); *A22C 2013/0053* (2013.01); *A22C 2013/0063* (2013.01); *A22C 2013/0083* (2013.01); *B32B 2250/05* (2013.01); *B32B 2250/24* (2013.01); *B32B 2270/00* (2013.01); *B32B 2274/00* (2013.01); *B32B 2307/518* (2013.01); *B32B 2307/558* (2013.01); *B32B 2307/702* (2013.01); *B32B 2307/736* (2013.01); *B32B 2307/746* (2013.01); *B32B 2439/70* (2013.01); *Y10T 428/1324* (2015.01); *Y10T 428/2495* (2015.01); *Y10T 428/31728* (2015.04); *Y10T 428/31732* (2015.04)

(58) Field of Classification Search
CPC ............... A22C 13/00; A22C 13/0013; A22C 2013/002; A22C 2013/053; Y10T 428/1324; Y10T 428/31728; Y10T 428/1393; B32B 225/05; B32B 225/24
USPC .......... 428/34.8, 36.91, 213, 34.3, 34.9, 35.7, 428/36.9, 475.8, 476.3; 425/474.7; 138/118, 118.1; 426/105, 106, 113, 426/127, 129
See application file for complete search history.

(56) References Cited

U.S. PATENT DOCUMENTS

| | | | | | |
|---|---|---|---|---|---|
| 4,303,711 | A | * | 12/1981 | Erk et al. | 428/34.8 |
| 4,665,135 | A | * | 5/1987 | Tse et al. | 525/432 |
| 5,399,427 | A | * | 3/1995 | Stenger et al. | 428/34.8 |
| 5,480,945 | A | * | 1/1996 | Vicik | 525/432 |
| 5,534,277 | A | * | 7/1996 | Ramesh et al. | 426/129 |
| 6,541,087 | B1 | * | 4/2003 | Pophusen et al. | 428/36.7 |
| 6,998,160 | B2 | * | 2/2006 | Grund et al. | 428/35.9 |
| 2005/0020762 | A1 | * | 1/2005 | Chou et al. | 524/502 |
| 2006/0147661 | A1 | * | 7/2006 | Tobben et al. | 428/34.8 |
| 2006/0182851 | A1 | * | 8/2006 | Kastl | 426/138 |
| 2006/0240207 | A1 | * | 10/2006 | Tobben et al. | 428/36.91 |

FOREIGN PATENT DOCUMENTS

| | | |
|---|---|---|
| DE | 40 01 612 A1 | 7/1991 |
| DE | 43 39 337 A1 | 5/1995 |
| EP | 0 530 538 A1 | 3/1993 |
| EP | 0 550 833 B1 | 7/1993 |
| EP | 0 603 678 B1 | 6/1994 |

* cited by examiner

*Primary Examiner* — Gwendolyn Blackwell
*Assistant Examiner* — Lee Sanderson
(74) *Attorney, Agent, or Firm* — ProPat, L.L.C.

(57) ABSTRACT

The invention relates to a biaxially drawn multilayer tubular film consisting of at least five layers, in which the external and two other layers contain aliphatic (co)-polyamide in a quantity equal to or greater than 50% by weight and are differently assembled. The inventive tubular film is produced by coextrusion and, thereby is seamless. Said tubular film can be used in the form of food product packagings, in particular as synthetic sausage casing.

20 Claims, No Drawings

BIAXIALLY DRAWN TUBULAR FILM COMPRISING THREE ADJACENT POLYAMIDE-BASED LAYERS

CROSS-REFERENCE TO RELATED APPLICATIONS

This application is being filed under Rule 1.371 as a National Stage Application of pending International Application No. PCT/EP2006/008666 filed Sep. 6, 2006, which claims priority to the following parent application: German Patent Application No. 10 2005 043 287.5, filed Sep. 9, 2005. Both International Application No. PCT/EP2006/008666 and German Patent Application No. 10 2005 043 287.5 are hereby incorporated by reference herein in their entirety.

FIELD OF THE INVENTION

The invention relates to a biaxially drawn tubular film having a plurality of polyamide-based layers, a process for production thereof and also use thereof as food casing, in particular as artificial sausage casing.

BACKGROUND OF THE INVENTION

Seamless tubular artificial casings are predominantly used in the production of cooked-meat sausages and scalded-emulsion sausages. Conventional casings have usually a 3- to 5-layer structure, wherein generally at least one of these layers comprises aliphatic polyamide and one comprises polyolefinic materials having water vapor-barrier character. Usually, the casings are biaxially drawn. In the case of the polyamide (PA) situated in the solid, the drawing leads to molecular orienting and to strain-induced crystallization. These effects produce a considerable increase in strength of the PA layers and a thermal shrinkage capacity of the casings, which is usually desirable in the application.

Since the biaxial drawing process in the case of tubular films always proceeds with the aid of free-standing stretching bubbles which are filled with gas or fluid cushions (termed the double-bubble process), the process cannot be controlled mechanically (from the outside). In principle there is always the risk of fluctuations of the bubble diameter (what are termed pulsations) up to sporadic overstretching and bursting of the stretching bubble. Since, among the polymer types conventionally used, only PA experiences significant orienting on drawing, the forces for stabilizing the stretching bubble also mainly proceed from this (progressive recovery forces).

Optimum bubble stability is only achievable when aliphatic PA types which crystallize moderately rapidly are used. Types which have proved to be particularly suitable are nylon 6, nylon 6/66 and also mixtures of these. Admixtures of further materials (for example other PA types, other polymers, pigments and other industrially desirable additives) are possible, but always have a tendency to destabilize the stretching bubble.

Frequently, demands are made on a food casing which cannot all be met with casing structures whose "supporting" component is a layer of nylon 6 (or of a mixture of nylon 6 and nylon 6/66).

The multilayer casings available on the market contain an outer main layer of nylon 6 and/or nylon 6/66, followed by thinner layers which do not form significant orienting on drawing. These are, for example, polyethylene layers. The inner surface is frequently formed by a further relatively thin PA layer. The thickness of the outer layer makes up usually 50 to 70% of the total film thickness and is therefore decisive for the stability of the stretching bubble and also for the mechanical strength of the casing.

Such casing structures, however, are frequently not found to be optimal in terms of performance. The use as sausage casing demands on the one hand high linear strength of the film and on extension the best possible elastic recovery, i.e. low residual extension. This may best be achieved by incorporating the thickest possible layer of nylon 6 into the structure. On the other hand, as far as possible soft-tough mechanics of the structure are required, in order that the casing, during end-processing and during stuffing, withstands the mechanical buckling loads as occur on high-speed modern systems. For this, structures having low-crystalline aliphatic copolyamides such as nylon 6/66 would be considerably more suitable. However, the aliphatic copolyamides, in the drawn state, do not approach nylon 6 with respect to strength and elastic recovery.

Surface layers of aliphatic copolyamides have a further disadvantage: owing to the low crystallinity of the polymers, surfaces lying one on top of another have a strong tendency to stick to one another. Sticking together can occur in the case of rolls wound up under standard tension, since the casings, during storage, develop a slight longitudinal shrinkage. Under extreme storage conditions, i.e. when the casings are stored at elevated temperature and high humidity, the adhesion tendency of the copolyamides increases further so that the risk of sticking together increases. Accordingly it would be advantageous to use copolyamide in an internal layer, or to cover it by a further layer, for example composed of nylon 6.

A food casing having two adjacent PA layers is described in EP-A 603 678. The second PA layer, which is covered by a PA layer surface, contains an inorganic and/or organic mixing additive. The object was to incorporate industrially necessary mixing additives into the casing structure and in this case to avoid the known production difficulties and disadvantages to quality which can occur in the case of additive-containing PA layers. The publication does not imply any effect on the relationships between linear strength and toughness or the like.

A further disadvantage in terms of performance of the conventional multilayer casings is their restricted printability. Food casings are frequently now used in printed form, in which case the printing is usually intended to proceed using physiologically and ecologically advantageous aqueous dispersion inks. The physical adhesion of such ink systems to PA is frequently inadequate in practice; in particular in the case of use as sausage casing, where high mechanical and climatic changing stresses occur, flaking off of ink layers can occur. Chemical anchoring is possible in principle in the case of most dispersion ink systems, in particular in the case of 2-component systems, but requires the presence of sufficiently reactive chemical groups in the film surface.

A surface composed of pure PA contains only very few reactive groups (end groups of the PA chain molecules). It would therefore be desirable to introduce additional reactive groups into the PA matrix, for example by blending in a further COOH-functional polymer.

Single layer sausage casings composed of mixtures containing PA and in proportion an acid-modified polyolefin are already disclosed by EP-B 550 833. As an example according to the invention, a casing composed of 79.6% by weight of nylon 6, 10% by weight of nylon 6-I/6-T, 10% by weight of an ethylene/methacrylic acid copolymer and 0.4% by weight of mica is specified therein. Foreign polymers such as ethylene/methacrylic acid copolymers, however, are not molecularly compatible with PA and in appropriate mixtures form a disperse phase. With increasing mixture fraction, the disperse phase can increasingly interfere with the coherence of the coherent PA phase which can lead to the loss of the general mechanical properties of the polyamide. This is expressed in particular in a drastic decrease of the bubble stability during drawing. In the case of casing structures which predominantly or entirely comprise such a mixture, therefore the fraction of foreign polymer must remain limited, i.e. any high concentration of reactive groups cannot be achieved. It would be desirable to be able to combine a casing surface which has been modified with reactive groups and is correspondingly readily printable with the better processing and mechanical properties of pure PA.

SUMMARY OF ADVANTAGEOUS EMBODIMENTS OF THE INVENTION

It was an object of the invention to provide a food casing in which a plurality of properties are advantageously combined:
a) high linear strength (according to the prior art)
b) high toughness of the film structure
c) no tendency for the film surfaces to stick to one another
d) possibility of reactive anchoring of 2 K dispersion printing inks to the outer surface (i.e. outer layer having a high concentration of COOH groups, for example)
e) stability of the production process according to the prior art (high inherent stability of the stretching bubble)

The object was achieved by a multilayer tubular film in which the outer layer and the two layers immediately following thereon are those based on polyamide each of differing composition.

DETAILED DESCRIPTION OF ADVANTAGEOUS EMBODIMENTS OF THE INVENTION

The present invention accordingly relates to a biaxially drawn tubular film having a plurality of polyamide-based layers, which has at least 5 layers, of which the outer layer and the two layers following thereon comprise 50% by weight or more of at least one aliphatic (co)polyamide, but are differently composed. The tubular film is preferably seamless. In a further preferred embodiment it is also heat set, but preferably not completely, so that a residual shrinkage of up to 20% remains in the longitudinal and transverse direction (measured after 15 min storage in hot water at 80° C.).

The outer layer and the two layers following thereon are layers based on aliphatic (co)polyamide and are immediately adjacent to one another, i.e. there are no adhesive layers in between. Further layers which can be present are those based on various materials, for example based on olefinic (co)polymers and again on PA. "(Co)polyamide", in the context of the present invention, means "polyamide and/or copolyamide", mutatis mutandis, the same applies to (copolymer etc.

The first layer, i.e. the external layer, contains at least 60% by weight of nylon 6 and at least 8% by weight of a thermoplastic carboxyl group-containing copolymer, for example an ethylene/methacrylic acid copolymer. In subsidiary amounts, in addition, aliphatic or partially aromatic (co)polyamides, color pigments and antiblocking pigments, plasticizers, lubricants and other conventional additives can be present. The layer contributes between 3 and 15%, preferably 5 to 10%, of the total thickness of the composite.

The second layer following thereon contains at least 25% by weight of nylon 6 and at least 25% by weight of nylon 6/66, preferably 40 to 70% by weight of nylon 6 and 30 to 60 by weight of nylon 6/66. In addition, further different additives can be present, in particular partially aromatic (co)polyamides, plasticizers and color pigments. The fraction of this layer of the thickness of the total composite is 10 to 30%, preferably 12 to 25%.

The third layer following thereon consists predominantly of nylon 6. Up to 25% by weight of further polymers can be present therein, in particular aliphatic and/or partially aromatic (co)polyamides, in addition conventional additives, as already listed above. The fraction of thickness of the layer of the total composite is 20 to 40%, preferably 25 to 35%.

The fourth layer contains at least one polymer which, on coextrusion, is able to develop adhesion to polyamide, for example an olefin (co)polymer grafted to the anhydride of an $\alpha,\beta$-unsaturated carboxylic acid. Further components which can be present are olefinic homo-, co- or terpolymers and/or heterofunctional copolymers (for example ethylene/acrylic ester copolymers or ethylene/vinyl acetate copolymers).

Further following layers can be composed differently, but preferably they contain one or more of the abovementioned polymer types. The final layer forming the inner surface is based preferably again on aliphatic (co)polyamide. Particularly preferably it contains 50% by weight or more of nylon 6, optionally 2 to 20% by weight of a partially aromatic (co) polyamide and also optionally at least one antiblocking pigment.

Preferred embodiments possess layer structures (sequence from the outside to the inside of the casing; the sign "//" marks the transition between two layers) as specified in the tables hereinafter:

| A (5 layers) | | | | | | | | |
|---|---|---|---|---|---|---|---|---|
| 1 | | 2 | | 3 | | 4 | | 5 |
| nylon 6 + FP 8 –20% | // | nylon 6 + 40 –70% | nylon 6/66 30 –60% | // | nylon 6 + 85 –95% | nylon 6/66 5 –15% | // | PO + 40 –70% | HV 30 –60% | // nylon 6 |

| B (5 layers) | | | | | | | | |
|---|---|---|---|---|---|---|---|---|
| 1 | | 2 | | 3 | | 4 | | 5 |
| nylon 6 + FP 8 –20% | // | nylon 6 + 40 –70% | nylon 6/66 30 –60% | // | nylon 6 + 85 –95% | partially aromatic PA 10 –40% | // | PO + 40 –70% | HV 30 –60% | // nylon 6 |

| C (7 layers) | | | | | | | | | | | | |
|---|---|---|---|---|---|---|---|---|---|---|---|---|
| 1 | | 2 | | 3 | | 4 | | 5 | | 6 | | 7 |
| nylon 6 +<br>FP 8<br>~20% | // | nylon 6<br>40<br>~70% | + | nylon 6/66<br>30<br>~60% | // | nylon 6<br>85<br>~95% | + | nylon 6/66<br>5<br>~15% | // | HV | // | PO | // | HV | // | nylon 6 |

| D (7 layers) | | | | | | | | | | | | |
|---|---|---|---|---|---|---|---|---|---|---|---|---|
| 1 | | 2 | | 3 | | 4 | | 5 | | 6 | | 7 |
| nylon 6 +<br>FP 8<br>~20% | // | nylon 6<br>40<br>~70% | + | nylon 6/66<br>30<br>~60% | // | nylon 6<br>85<br>~95% | + | nylon 6/66<br>5<br>~15% | // | HV | // | EVOH | // | HV | // | nylon 6 |

The abovementioned percentages are percentages by weight, based on the respective individual layer. The abbreviations represent the main components) of the respective layers and have the following meanings:

nylon 6: polycaprolactam,

FP, thermoplastic, carboxyl group-containing copolymer (for example an ethylene/methacrylic acid copolymer=EMAA copolymer), nylon 6/66: copolymer of ε-caprolactam, adipic acid and 1,6-diaminohexane, PO: olefinic (co)polymer, for example polyethylene (HDPE or LDPE), ethylene/α-olefin copolymers, polypropylene, ethylene/propylene copolymers, terpolymers of various olefins. Heterofunctional olefin copolymers can also be present in proportion, for example copolymers of ethylene and vinyl acetate, ethylene and (meth)acrylic acid, the corresponding ionomers containing Na or Zn ions, copolymers of ethylene and alkyl esters of (meth)acrylic acid and also correspondingly functionalized terpolymers, HV: olefin-containing polymer which is modified with functional groups and as a result can develop an adhesion to adjoining layers of polyamide or EVOH. Examples: polyethylene (or ethylene/α-olefin copolymer) grafted with the anhydride of an α,β-unsaturated dicarboxylic acid (especially maleic anhydride), ethylene/vinyl acetate copolymers, ethylene/(meth)acrylic acid copolymers and their Na or Zn salts, ethylene/(meth)acrylic ester copolymers and also corresponding terpolymers, EVOH: ethylene/vinyl alcohol copolymer. This contains preferably 29 to 47 mol % of ethylene units, 71 to 53 mol % of vinyl alcohol units aria 0 to 5 mol % of vinyl acetate units.

Each of the abovedescribed layers, in particular those in which polyamides and polyolefins are present, can be admixed with organic and/or inorganic materials. These are, for example, further polymers, plasticizers, lubricants, stabilizers, and also antiblocking and matting pigments, matting agents and/or UV absorbers.

The layer composite has a total thickness in the range 20 to 65 μm, preferably 25 to 50 μm. The individual layers 1 to 4 have generally the following thicknesses:

| layer 1 | 1.5 to 8 μm, wherein the fraction of the thickness of the total structure is 3 to 15%, preferably 5 to 10% |
|---|---|
| layer 2 | 2.5 to 15 μm, wherein the fraction of the thickness of the total structure is 10 to 30%, preferably 12 to 25% |
| layer 3 | 5 to 25 μm, wherein the fraction of the thickness of the total structure is 20 to 40%, preferably 25 to 30% |
| layer 4 | 2 to 15 μm, wherein the fraction of the thickness of the total structure is 3 to 40%, preferably 5 to 30% |

The casing of the invention is produced by coextrusion using a multilayer ring die and subsequent biaxial tubular drawing according to the prior art. Corresponding processes are published and are familiar per se to those skilled in the art.

Conventionally, the plastics or their blends provided for each layer are melted and plasticized in separate extruders and also combined in a heated coextrusion ring die. The exiting ring-shaped melt film is solidified by rapid cooling to form a substantially amorphous pretube and this is biaxially drawn by subsequent reheating (typically to about 60 to 90° C.) and using an air cushion enclosed between two sets of pinch rolls.

Subsequently, heat setting can proceed, by the drawn tube being conducted through a further heating zone, optionally stabilized by a further air cushion. As a result the thermal shrinkage tendency may be decreased to values suitable in practice which are generally in the range 5 to 20% in the longitudinal and transverse direction (measured at 80° C.).

The examples hereinafter are intended to illustrate the invention without limiting it in any manner. Percentages therein are percentages by weight unless stated otherwise or clear from the context.

Starting Materials:

nylon 6: nylon 6 having a relative viscosity of 4 (measured in 96% strength sulfuric acid) (ULTRAMID® B40 from BASF AG)

nylon 6/66: nylon 6/66 (82:18 fractions by weight) having a relative viscosity of 4 (measured in 96% strength sulfuric acid) (ULTRAMID® C40 from BASF AG)

EMAA: copolymer of 91% ethylene and 9% methacrylic acid having a melting point of 101° C. (measured by DSC) and a melt flow index (MFI) of 2.5 g/10 min (measured under 2.16 kg load at 190° C.) (NUCREL® 0903 from DuPont de Nemours and Company)

HV: linear low density polyethylene (LLDPE), grafted with approximately 0.3% by weight of maleic anhydride (MA) and having an MIDI of 1.6 g/10 min (measured under 2.16 kg load and at 190° C.) (BYNEL® 4164 from Du Pont de Nemours and Company)

PE: polyethylene of the LDPE type having a density of 0.9220 g/cm³ and having an MFI of 0.33 (measured under 2.16 kg load and at 190° C.) (ESCORENE® LD166 BW1 from ExxonMobil Chemical Corp.)
partially
aromatic
PA: amorphous copolyamide composed of 1,6-diaminohexane with terephthalic acid and isophthalic acid (ratio 30:70) and having a glass transition temperature of 130° C. (SELAR® PA3426 from Du Pont de Nemours and Company)
PA-Ab: antiblocking masterbatch of nylon 6 and calcium carbonate (weight ratio 98:2) (GRILON® XE 3690 from Ems-Chemie AG)
Equipment Used for the Production:
Use was made of multilayer extrusion systems according to the prior art having a tube calibration system, downstream stretching zone for biaxial bubble stretching and finally heat setting (called double bubble systems).

For example 1, and also for comparative examples C1 and C2, use was made of a system having a 5-layer ring die which was fed by five extruders, i.e. it was provided with one extruder for each layer. For examples 2 and 3, and also for comparative example C3, use was made of a system having a 7-layer ring die to which likewise a separate extruder was connected for each layer.

Quantities for Characterizing Samples from the Examples

5% yield stress ($\sigma_S$) [N/mm²] and tear strength ($\sigma_R$) [N/mm²]
was determined by tensile stress-elongation measurement as specified in DIN 53455 on longitudinally and transversely excised sample strips of 15 mm width and 50 mm clamping distance which had been placed in cold water for 30 min before measurement.

Elongation at break—without prestressing ($\epsilon_{R0}$) [%]
was likewise determined by tensile stress-elongation measurement as specified in DIN 53455 on longitudinally excised sample strips of 15 mm width and 50 mm clamping length which had been placed in cold water for 30 min before measurement. For each exemplary embodiment, 5 samples were measured and the mean taken of the values.

Elongation at break—with prestressing ($\epsilon_{RV}$) [%]
The determination was performed over two steps:
1. Mechanical Flex Stressing The stressing was performed using a Gelbo tester as specified in ASTM standard F392-93 (1999), sections 5 to 8, and as specified in condition D listed under paragraph 8.1.5. Use was made of film sections of 280 mm (longitudinal to the running direction) by 200 mm (transversely to the running direction). For each exemplary embodiment, 5 sections were so treated.
2. Measurement From each of the prestressed film sections, in each case a sample of a size of 90×15 mm was cut out centrally and longitudinally, this was placed in cold water for 30 min and then, on this, using 50 mm clamping length, the elongation at break was measured as described above. The mean was likewise taken of the 5 resulting measured values for each exemplary embodiment.

Bonding Tendency 2 sections of approximately 100×100 nm of the sane casing example were placed on a planar metal plate with the outsides facing each other and loaded centrally with a weight of 1 kg and having a contact area of 28 cm⁶. This arrangement was brought into a controlled climate chamber and stored there for 8 days at 38° C. and at a relative humidity of 85%. Subsequently the weight was removed and the film pieces lying one above the other were pulled apart manually from one corner. The rating was performed by appearance using the scores 1 to 5, wherein the scores have the following meanings:
1=films separate independently, no bonding effect
2=slight adhesion at points, separation with minimum exertion of force
3=partial adhesion, significant exertion of force, still no damage to the surfaces
4=full-surface adhesion, increased exertion of force, partial surface damage or delamination
5=full-surface adhesion, films may be separated only with destruction or extensive delamination Detachment of Printing Ink For this, casing material according to examples was first printed under conditions close to those in practice. Subsequently, the climatic conditions of scalded-emulsion sausage production were simulated on printed sample pieces ("boiling stress") and the mechanical adhesion of the color layers thereon was tested using adhesive tape.
1. Printing Use was made of a conventional flexo printing machine having a corona preliminary stage and color application via a screen roller using a 180 lines per cm screen, an unetched block (full-surface application) and hot air drying (approximately 60° C.). A commercially available 2 K dispersion printing ink of white shade was used (WAFLEX® 10WD 15-2 from Druckfarbenwerke Gebr. Schmidt GmbH). The color application was post-hardened by 4-day storage of the printed casing material at room temperature.
2. Boiling Stress Sample sections of the printed material were placed in hot water at 90° C. for 10 min.
3. Adhesion Test Just after the film pieces were taken out, they were fixed to a smooth support with the printed side upwards, wiped dry and pieces of "Scotch Magic 810" adhesive tape were bonded thereto. Immediately afterwards, the adhesive tape pieces were rapidly pulled off again from the end at an angle of 180°. A visual estimation was made as to the percentage area of the ink situated beneath the adhesive tape which had transferred to the adhesive tape when it was pulled off.

Example 1 and Comparative Examples C1, C2

In the first above-described extrusion system, via 5 extruders, 5 separate melt streams were generated and after exit from the die were solidified to form pretubes of 23 mm diameter. The pretubes were biaxially drawn by an area factor of 8.3 using an air cushion enclosed between two sets of pinch-rolls. In all cases a stable stretching bubble was established having a diameter variation of a maximum of ±1.5 mm. Over the experimental period (approximately 30 min) no bursting or tearing of the stretching bubble occurred in any case. The drawn tube was then conducted through a heat setting zone, laid flat and wound up. The resultant casings had a caliber of 65 and a shrinkage (measured after 15 min immersion in hot water at 80° C.) of approximately 12% in the longitudinal direction and approximately 10% in the transverse direction. The plastics or plastic mixtures used, their arrangement in the casing structure and the total thicknesses may be found in tables 1 and 2.

Examples 2, 3 and Comparative Example C3

In the second above-described extrusion system, via 7 extruders, 7 separate melt streams were generated and after exit from the die these were likewise solidified to form pretubes of 23 mm diameter. The pretubes were biaxially drawn by an area factor of 8.3, as already described above. Here also, in all cases a stable stretching bubble was established having a diameter variation of a maximum of ±1.3 Inn. Again, there was no bursting or tearing of the stretching bubble over a period of approximately 30 min. The drawn tube was subsequently heat set, laid flat and wound up. The resultant casings had a caliber of 65 and a shrinkage (measured after 15 min immersion in hot water at 80° C.) of approximately 14% in the longitudinal direction and approximately 11% in the transverse direction. The plastics and plastic mixtures used, the arrangement of the layers produced thereby in the casing structure and the total thicknesses again may be found in tables 1 and 2.

TABLE 1

Layer structure in examples 1 to 3

| Example No. | Layer (1 = outside) | Composition [% by weight] | Layer thickness individual μm | % | total μm |
|---|---|---|---|---|---|
| 1 embodiment A | 1 | nylon 6 [80] + EMAA [15] + PA-Ab [5] | 3 | 6.7 | 45 |
| | 2 | nylon 6 [50] + nylon 6/66 [50] | 7 | 15.5 | |
| | 3 | nylon 6 [90] + nylon 6/66 [10] | 14 | 31.1 | |
| | 4 | PE [50] + HV [50] | 14 | 31.1 | |
| | 5 | nylon 6 [85] + partially aromatic PA [10] + PA-Ab [5] | 7 | 15.6 | |
| 2 embodiment C | 1 | nylon 6 [80] + EMAA [15] + PA-Ab [5] | 3 | 6.3 | 48 |
| | 2 | nylon 6 [50] + nylon 6/66 [50] | 7 | 14.6 | |
| | 3 | nylon 6 [90] + nylon 6/66 [10] | 13 | 27.1 | |
| | 4 | HV [100] | 3 | 6.2 | |
| | 5 | PE [100] | 14 | 29.2 | |
| | 6 | HV [100] | 3 | 6.2 | |
| | 7 | nylon 6 [85] + partially aromatic PA [10] + PA-Ab [5] | 5 | 10.4 | |
| 3 embodiment C | 1 | nylon 6 [80] + EMAA [15] + PA-Ab [5] | 3 | 6.4 | 47 |
| | 2 | nylon 6 [50] + nylon 6/66 [50] | 11 | 23.4 | |
| | 3 | nylon 6 [90] + nylon 6/66 [10] | 11 | 23.4 | |
| | 4 | HV [100] | 3 | 6.4 | |
| | 5 | PE [100] | 11 | 23.4 | |
| | 6 | HV [100] | 3 | 6.4 | |
| | 7 | nylon 6 [85] + partially aromatic PA [10] + PA-Ab [5] | 5 | 10.6 | |

TABLE 2

Layer structure for comparative examples C1 to C3

| Example No. | Layer (1 = outside) | Composition [% by weight] | Layer thickness individual μm | % | total μm |
|---|---|---|---|---|---|
| C1 | 1 | nylon 6 [95] + PA-Ab [5] | 3 | 6.5 | 46 |
| | 2 | nylon 6 [100] | 7 | 15.2 | |
| | 3 | nylon 6 [90] + nylon 6/66 [10] | 15 | 32.6 | |
| | 4 | PE [50] + HV [50] | 14 | 30.4 | |
| | 5 | nylon 6 [85] + partially aromatic PA [10] + PA-Ab [5] | 7 | 15.3 | |
| C2 | 1 | nylon 6/66 [95] + PA-Ab [5] | 3 | 6.5 | 47 |
| | 2 | nylon 6 [100] | 8 | 17 | |
| | 3 | nylon 6 [90] + nylon 6/66 [10] | 14 | 29.8 | |
| | 4 | PE [50] + HV [50] | 15 | 31.9 | |
| | 5 | nylon 6 [85] + partially aromatic PA [10] + PA-Ab [5] | 7 | 14.9 | |
| C3 | 1 | nylon 6 [80] + EMAA [15] + PA-Ab [5] | 3 | 6 | 50 |
| | 2 | nylon 6 [100] | 7 | 14 | |
| | 3 | nylon 6 [90] + nylon 6/66 [10] | 14 | 28 | |
| | 4 | HV [100] | 3.5 | 7 | |
| | 5 | PE [100] | 13 | 26 | |
| | 6 | HV [100] | 3.5 | 7 | |
| | 7 | nylon 6 [85] + partially aromatic PA [10] + PA-Ab [5] | 6 | 12 | |

The test values determined on the samples from the examples are listed in table 3 hereinafter.

Comparison of the values for the 5% yield stress with those for the elongation at break shows that no significant strength differences exist between the casings of the invention and the casings based on the prior art. However, the casing according to C2 (with layers predominantly or completely composed of nylon 6/66) shows itself to be significantly inferior.

If a pairwise comparison is made between the values of elongation at break without and with prior flex stressing respectively, no significant decrease is seen in the casings of the invention. The casings according to C1 and C3, in contrast, show a large decrease in elongation at break after prestressing. The casings of the invention, accordingly, are considerably more resistant to flex stressing and they have superior toughness respectively.

In the scores for bonding tendency, a significant inferiority of the casing according to C2 compared with the casings of the invention is shown (in C2 the outer layer consists of 95% nylon 6/66, corresponding to the prior art).

If the values for the percentage printing ink detachment are compared, the advantage of the casings having an outer layer as in the invention (examples 1 to 3 and C3) compared with casings having an outer layer as is taught in the prior art (examples C1 and C2) is clearly seen. In the casings having EMAA copolymer in the outer layer, chemical anchoring of the printing ink via the acid groups appears to occur.

TABLE 3

Test values of the casings according to the examples and the comparative examples

| Example No. | $\sigma_S$ [N/mm$^2$] longitudinal | $\sigma_S$ [N/mm$^2$] transverse | $\sigma_R$ [N/mm$^2$] longitudinal | $\sigma_R$ [N/mm$^2$] transverse | $\epsilon_{R0}$ [%] longitudinal | $\epsilon_{RV}$ [%] longitudinal | Bonding tendency (scores 1 to 5) | Printing ink detachment [area %] |
|---|---|---|---|---|---|---|---|---|
| 1 | 15.1 | 13.8 | 103 | 98 | 108 | 103 | 1 | 3 |
| 2 | 14.6 | 13.4 | 98 | 96 | 117 | 113 | 2 | 2 |
| 3 | 14.1 | 13.3 | 96 | 95 | 119 | 117 | 1 | 3 |
| C1 | 16.2 | 14.7 | 111 | 102 | 95 | 76 | 1 | 50 |
| C2 | 13.8 | 12.2 | 88 | 82 | 123 | 118 | 4 | 45 |
| C3 | 15.9 | 14.6 | 109 | 100 | 96 | 74 | 1 | 3 |

What is claimed is:

1. A biaxially drawn tubular film comprising 5 or 7 layers, of which each of the outer layer and the two layers following thereon are immediately adjacent to one another and are aliphatic polyamide-based layers containing at least one aliphatic (co)polyamide, but said layers are otherwise differently composed and the layer which forms an outside surface of said film consists of 60% to 80% by weight of nylon 6 and 8% to 20% by weight of a thermoplastic copolymer containing carboxyl groups, the 2nd layer from the outside consists of a mixture of 40 to 70% by weight of nylon 6 and 30 to 60% by weight of nylon 6/66, and the 3rd layer from the outside consists of 85 to 95% by weight of nylon 6 and 5 to 15% by weight nylon 6/66, said film further comprises a 4$^{th}$ layer from the outside, an optional 5$^{th}$ layer from the outside, optional 6$^{th}$ layer from the outside, and an inner surface layer, said 4$^{th}$ layer consists of (i) olefin-containing polymer selected from the group consisting of polyethylene or ethylene/α-olefin copolymer grafted with the anhydride of an α,β-unsaturated dicarboxylic acid, ethylene/vinyl acetate copolymers, ethylene/vinyl acetate copolymers, ethylene/(meth)acrylic acid copolymers and their Na or Zn salts, ethylene/(meth)acrylic ester copolymers and corresponding terpolymers and optionally (ii) olefinic (co)polymer, ethylene/α-olefin copolymers, polypropylene, polyethylene, ethylene/propylene copolymers, olefin terpolymer or heterofunctional olefin copolymers, said optional 5$^{th}$ layer consists of olefinic (co)polymer, ethylene/α-olefin copolymers, polypropylene, ethylene/propylene copolymers, olefin terpolymer or heterofunctional olefin copolymers or ethylene/vinyl alcohol copolymer, said optional 6$^{th}$ layer consists of (i) olefin-containing polymer selected from the group consisting of polyethylene or ethylene/α-olefin copolymer grafted with the anhydride of an α,β-unsaturated dicarboxylic acid, ethylene/vinyl acetate copolymers, ethylene/vinyl acetate copolymers, ethylene/(meth)acrylic acid copolymers and their Na or Zn salts, ethylene/(meth)acrylic ester copolymers and corresponding terpolymers;

and said inner surface layer comprises nylon 6.

2. The tubular film as claimed in claim 1, wherein the layer which forms the outside contributes 3 to 15% of its total thickness.

3. The tubular film as claimed in claim 1, wherein the 2nd layer from the outside contributes 10 to 30% of the total thickness of said film.

4. The tubular film as claimed in claim 1, wherein the 3rd layer from the outside contributes 20 to 40% of the total thickness of said film.

5. The tubular film as claimed in claim 1, wherein the 4th layer from the outside comprises a (co)polymer providing adhesion to an adjoining polyamide layer.

6. The tubular film as claimed in claim 1, wherein the layer which forms the inside layer of said film is based on at least one aliphatic (co)polyamide.

7. The tubular film as claimed in claim 6, wherein the inside layer comprises 50% by weight or more of nylon 6, optionally 2 to 20% by weight of a partially aromatic (co)polyamide, and optionally at least one antiblocking pigment.

8. The tubular film as claimed in claim 1, wherein said film has a shrinkage of 3 to 20% in the longitudinal and transverse direction, measured after storage for 15 min in hot water at 80° C.

9. Food casing comprising tubular film as claimed in claim 1.

10. The tubular film as claimed in claim 1, wherein the thermoplastic copolymer containing carboxyl groups, is an ethylene/(meth)acrylic acid copolymer.

11. The tubular film as claimed in claim 1, wherein the layer which forms the outside contributes 5 to 10% of its total thickness.

12. The tubular film as claimed in claim 11, wherein the 3rd layer from the outside contributes 25 to 35% of the total thickness of film.

13. The tubular film as claimed in claim 1, wherein the 2nd layer from the outside contributes 12 to 25% of the total thickness of said film.

14. The tubular film as claimed in claim 1, wherein said film has a total wall thickness of 25 to 50 μm.

15. Artificial sausage casing comprising tubular film as claimed in claim 1.

16. A biaxially drawn coextruded 5 or 7 layer tubular film comprising a plurality of aliphatic polyamide-based layers consisting of polymer and optional materials, of which each of the outer layer and the two layers following thereon are immediately adjacent to one another are aliphatic polyamide-based layers containing at least one aliphatic (co)polyamide, but said layers are otherwise differently composed, wherein the outer polyamide-based layer of said film forms an outer layer of a casing and contains at least 60% by weight of nylon consisting of nylon 6 and at least 8% by weight of a thermoplastic copolymer containing carboxyl groups, the 2nd polyamide-based layer from the outside consists of a mixture of 40 to 70% by weight of nylon 6 and 30 to 60% by weight of nylon 6/66, and the $3^{rd}$ polyamide-based layer from the outside consists of 85 to 95% by weight of nylon 6 and 5 to 15% by weight nylon 6/66, wherein said optional materials consist of further polymers, plasticizers, lubricants, stabilizers, antiblocking pigments, matting pigments, matting agents and/or UV absorbers, and color pigments within in said outer layer, said film exhibits a higher elongation at break, as determined per DIN 53455, than said film formed without said nylon 6/66 within said second layer.

17. A biaxially drawn, coextruded 5 or 7 layer tubular film comprising a plurality of aliphatic polyamide-based layers, of which each of the outer layer and the two layers following thereon are immediately adjacent to one another and comprise at least one aliphatic (co)polyamide, but said layers are otherwise differently composed, the outer layer of said film forms an outer layer of a casing and contains at least 60% by weight of nylon consisting of nylon 6 and at least 8% by weight of a thermoplastic copolymer containing carboxyl groups, the 2nd layer from the outside consists of a mixture of 40 to 70% by weight of nylon 6 and 30 to 60% by weight of nylon 6/66, and the $3^{rd}$ layer from the outside consists of 85 to 95% by weight of nylon 6 and 5 to 15% by weight nylon 6/66, wherein said film has a total wall thickness of 20 to 65 μm, the layer which forms the outside contributes 3 to 15% of the total thickness, the 2nd layer from the outside contributes 10 to 30% of the total thickness, and the 3rd layer from the outside contributes 20 to 40% of the total thickness of said film.

18. A biaxially drawn coextruded 5 or 7 layer tubular food casing comprising a plurality of aliphatic polyamide-based layers, of which an outer layer and the two layers disposed immediately adjacent to one another thereon comprise at least one aliphatic (co)polyamide, but said layers are otherwise differently composed, said outer layer further including at least 8% by weight of a thermoplastic copolymer containing carboxyl groups, the $2^{nd}$ layer from the outside consists of a mixture of 40 to 70% by weight of nylon 6 and 30 to 60% by weight of nylon 6/66, and the $3^{rd}$ layer from the outside consists of 85 to 95% by weight of nylon 6 and 5 to 15% by weight nylon 6/66, wherein said layers other than said $2^{nd}$ and $3^{rd}$ layers further optionally containing material consisting of further polymers, plasticizers, lubricants, stabilizers, antiblocking pigments, matting pigments, matting agents and/or UV absorbers.

19. A process for producing a tubular film as claimed in 1 comprising the following steps:

supplying the plastics or plastic blends provided for the individual layers, melting the plastics or plastic blends in separate extruders to give thermoplastic melts, combining the thermoplastic melts in a heated coextrusion ring die, extruding a tubular melt film, solidifying the melt film to form a substantially amorphous pretube by rapid cooling, heating the pretube to a temperature suitable for drawing, biaxially drawing the heated pretube via the pressure of an internally-acting gas, and optionally heat setting the drawn tube.

20. A process for producing a tubular film as claimed in claim 19, wherein said internally-acting gas is air.

\* \* \* \* \*